US012432222B2

(12) United States Patent
Tiwari et al.

(10) Patent No.: US 12,432,222 B2
(45) Date of Patent: Sep. 30, 2025

(54) SYSTEMS AND METHODS FOR SPAM BLOCKING USING ARTIFICIAL INTELLIGENCE IN A TIERED SOFTWARE FRAMEWORK

(71) Applicant: HighLevel Inc., Dallas, TX (US)

(72) Inventors: Shivam Tiwari, Toronto (CA); Ashutosh Anand, Bokaro (IN); Rishabh Rajput, Mainpuri (IN); Shubham Gupta, Lucknow (IN); Hardik Bhatt, Noida (IN); Swapnil Kumar, Ghaziabad (IN); Shaun Clark, Eugene, OR (US); Robin Alex, Dallas, TX (US); Varun Vairavan, Doha (QA)

(73) Assignee: HighLevel Inc., Dallas, TX (US)

( * ) Notice: Subject to any disclaimer, the term of this patent is extended or adjusted under 35 U.S.C. 154(b) by 195 days.

(21) Appl. No.: 18/470,799

(22) Filed: Sep. 20, 2023

(65) Prior Publication Data
US 2025/0097236 A1    Mar. 20, 2025

(51) Int. Cl.
*H04L 9/40* (2022.01)
*G06N 3/08* (2023.01)

(52) U.S. Cl.
CPC ............. *H04L 63/123* (2013.01); *G06N 3/08* (2013.01)

(58) Field of Classification Search
CPC ................................ H04L 63/123; G06N 3/08
USPC ............................................................ 726/22
See application file for complete search history.

(56) References Cited

U.S. PATENT DOCUMENTS 11,423,018 B1 *  8/2022  Paiz ....................... G06F 16/243

\* cited by examiner

*Primary Examiner* — Lan Dai T Truong
(74) *Attorney, Agent, or Firm* — Aambell PC

(57) ABSTRACT

Embodiments of a method for facilitating spam blocking in a tiered software framework include: determining that a message template is generated in the tiered software framework, parsing the message template, automatically performing a semantic search for regulated content in the parsed message template, assigning a score to the message template based on the semantic search, and responsive to the score being higher than a predetermined threshold, blocking generating of any message from the message template. The tiered software framework comprises a first tier, a second tier, and a third tier, the second tier comprises accounts of a first plurality of subscribers, the third tier comprises subaccounts of the accounts, the subaccounts associated with a second plurality of subscribers, and the message template is associated with one of the subaccounts in the third tier.

20 Claims, 8 Drawing Sheets

SYSTEMS AND METHODS FOR SPAM BLOCKING USING ARTIFICIAL INTELLIGENCE IN A TIERED SOFTWARE FRAMEWORK

TECHNICAL FIELD

The present disclosure relates to systems, techniques, and methods directed to systems and methods for spam blocking using artificial intelligence (AI) in a tiered software framework.

BACKGROUND

AI is a growing field in computer science that uses machine learning models to make predictions, recommendations, or classifications based on input data. Revenue from the AI software market worldwide is expected to reach more than one hundred billion dollars by 2025 according to some estimates. In some domains, such as marketing, AI has the potential to deliver highly targeted and personalized advertisements using behavioral analysis, pattern recognition, and other learning algorithms.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

DETAILED DESCRIPTION

Overview

Figure 1:
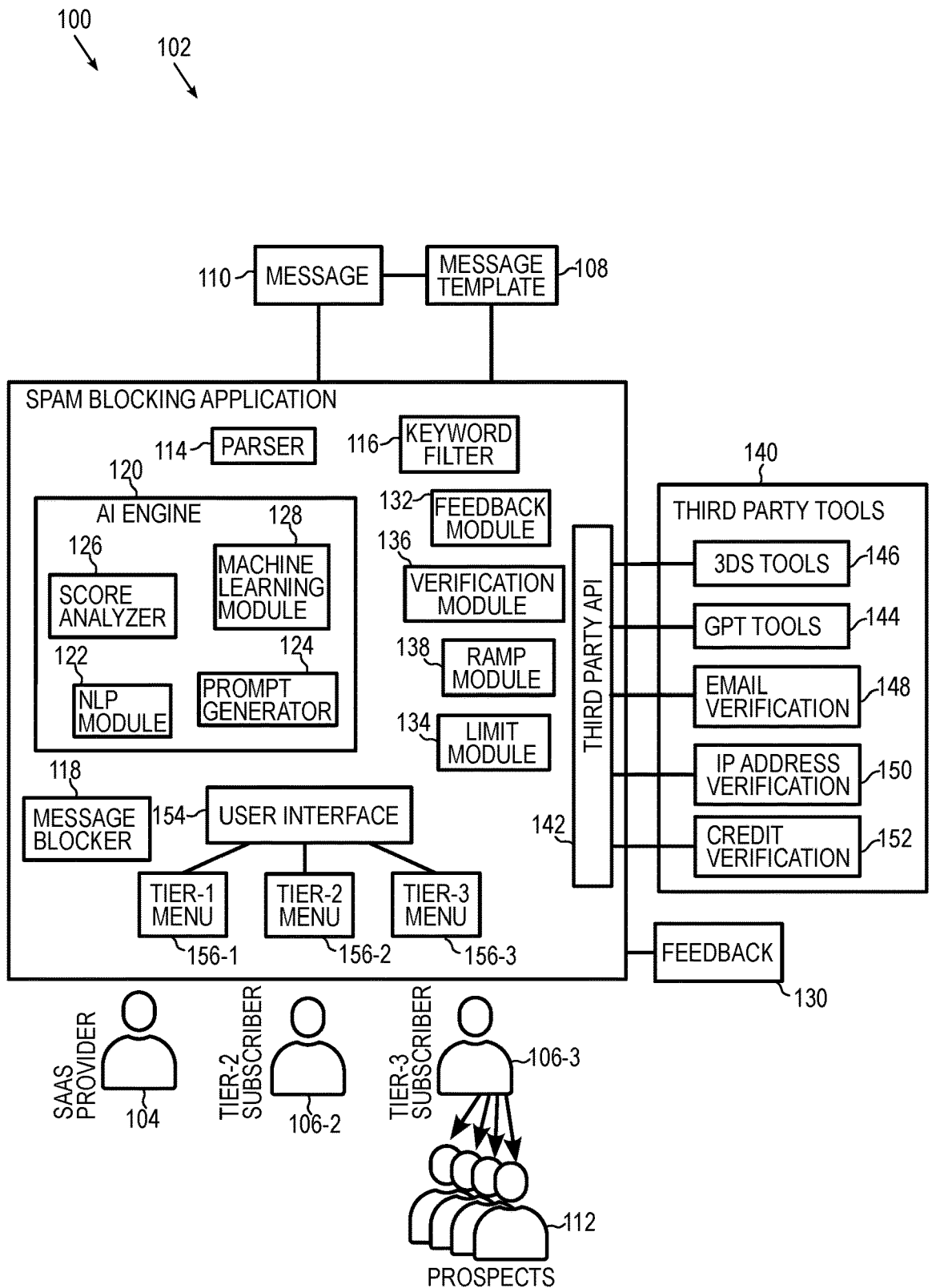
FIG. 1 is a simplified block diagram illustrating an example application for facilitating spam blocking in a tiered software framework, according to some embodiments of the present disclosure.

For purposes of illustrating the embodiments described herein, it is important to understand certain terminology and operations of technology networks. The following foundational information may be viewed as a basis from which the present disclosure may be properly explained. Such information is offered for purposes of explanation only and, accordingly, should not be construed in any way to limit the broad scope of the present disclosure and its potential applications.

AI uses machine learning models to make predictions, recommendations, and classifications. In general, machine learning models use algorithms to parse data, learn from the parsed data, and make informed decisions based on what it has learned. According to some classifications, deep learning models are subsets of machine learning models, being machine learning algorithms that operate in multiple layers, creating an artificial neural network. According to some other classifications, machine learning models are those that rely on human intervention to learn, whereas deep learning models automatically learn without human intervention. Because the learning algorithms are more relevant to the disclosure herein than any human intervention to provide training data, the former classification is employed herein, such that wherever "machine learning models" is used, it is intended that deep learning models are included as well.

Deep learning models in particular, enable AI algorithms such as generative AI models (e.g., ChatGPT™). In a general sense, AI algorithms have three qualities that differentiate them from other algorithms: intentionality, intelligence, and adaptability. As intentional algorithms, they make decisions, often using real-time data, combining information from a variety of different sources, analyzing the combined information instantly, and acting on insights derived from such data. As intelligent algorithms, they are capable of spotting patterns in underlying data. As adaptable algorithms, they learn and adapt their analyses based on shifting input data.

Recent advances in AI have made possible commercially available AI engines that expose application programming interfaces (APIs) for other applications to consume. In a general sense, the API is a set of rules and protocols that defines how two software systems may communicate with each other. AI APIs allow advanced AI capabilities of the AI engine to be integrated into applications by allowing the application to make requests to the API and to receive responses. Thus, these applications provide, through the API, data to the AI engine, which runs machine learning models on the data to give suitable results as requested by the applications. Different AI engines may use different machine learning models, thereby providing different results to the same input data. Some AI engines may provide a certain functionality (e.g., text processing only) and some other AI engines may provide a certain other functionality (e.g., image processing only), while some others may provide multiple functionalities (e.g., text, speech, and image processing).

One of the ways in which AI can be used is to facilitate spam blocking at the source. In today's fast-paced tech world, securing user accounts from fraud is paramount. With increasing prevalence of cyber threats and the ever-evolving tactics used by fraudsters, safeguarding user accounts has become a top priority for businesses operating in the digital realm. Indeed, combating fraud sign-ups is essential for Software as a Service (Saas) companies to protect the integrity of their platform, prevent financial losses, ensure data security, enhance user trust, and improve the user experience. It is a critical aspect of maintaining a secure and reliable SaaS platform and fostering a positive relationship with users.

A part of spam blocking includes regulating short message service (SMS) texts. SMS texts are subject to strict regulations, industry standards, and guidelines. Before using it to market products, promote sales, or simply communicate with customers, it must be screened to prevent dissemination of prohibited or limited content. In particular, federal guidelines in the United States and Canada prohibit text messages having content that relates to Sex, Hate, Alcohol, Firearms, and Tobacco (S.H.A.F.T.) These S.H.A.F.T categories are specifically regulated, monitored and enforced by mobile carriers. Sex (adult content), Alcohol, Firearms, and Tobacco are federally legal and can be marketed through SMS as long as a functioning age-gate is in place. The age-gate needs to prompt the user to enter their birthdate, rather than just click "Yes" to approve that they're over 21. Other than the S.H.A.F.T. categories, certain other content is also prohibited, including depictions and endorsement of violence, profanity, and hate/discriminatory speech. Mobile carriers may be responsible for the distribution of text message content, and therefore act as gatekeepers to prevent such messages in their communication networks. Each mobile carrier may issue its own guidelines when it comes to text message content. For example, such content may include high-risk financial services, gambling, multi-level marketing, etc., all of which may be subject to the mobile carrier's guidelines.

Accordingly, embodiments of the tiered software framework facilitate various operations to ensure that federal regulations and carrier guidelines are enforced in text messages sent using the software platform. When a new user signs up on the software platform, relevant information such as the name of the account owner, business name, verified email address, phone number, and credit card details may be captured. Measures may be implemented to prevent the use of burner emails or blacklisted domains that are flagged in an email partner system. To enhance security, the pin code (i.e., zip code) may be collected and matched with the Internet Protocol (IP) address region of the person signing up, as well as matched with the credit card address. Credit card verification and address verification using a suitable third-party payment processor may be performed, for example, to ensure the authenticity of the credit card.

Additional information about the subscriber may also be collected, such additional information including industry, niche, number of years in the industry, number of clients, company website, and Employer Identification Number (EIN) number if available. The third-party payment processing system's risk mitigation processes and tools may be used to block sign-ups from high-risk countries or geographies, for example, to prevent fake sign-ups. Sign-ups with a history of bad payment records and a risk score of 60 or higher may also be blocked. The software system may check for previously used fraudulent cards to prevent their reuse in the system.

After the subscriber signs up, the credit card may be verified using 3 Domain Secure (3DS) technology to ensure it is a working card and not stolen. The 3DS security protocol adds an additional level of payment protection to an online transaction by requiring users to verify their payment card information using a secure, multi-factor authentication process. This helps to ensure that the card being used for sign-up is legitimate and reduces the risk of fraudulent card usage. For example, in order to complete an online purchase, the cardholder may be asked to provide proof of identity by entering a unique password, an SMS code or a temporary personal identification number (PIN). After basic validation, error rates and opt-out rates are monitored, and based on severity of violation, the SMS-sending capabilities of the account are paused or suspended.

In various embodiments, an AI engine may monitor outgoing content for phishing, *cannabis*, S.H.A.F.T., gambling, etc., and restrict such content from being sent. Automated emails may be sent to the users, providing best practices for using features such as SMS and calls. The AI-powered engine may use advanced algorithms and machine learning to analyze patterns of user behavior and identify potential spam sign-ups in real-time. By detecting anomalies and suspicious patterns of activity, the AI-powered engine may automatically block fraudulent sign-ups before they can gain access to the system.

A ramp-up approach may be enforced for the first 10 days for new users (e.g., 250 SMS limit on day one, 500 SMS limit on day two, 750 SMS limit on day three, and so on). In some embodiments, the ramp-up model component of the feature involves gradually increasing the level of access and permissions granted to new sign-ups over time. This helps to mitigate the risk of potential fraud by allowing users to gain access to more features and functionalities gradually, based on their behavior and usage patterns. Such a ramp-up technique may prevent fraudulent sign-ups from immediately gaining full access to the system, reducing the potential damage they can cause.

In some embodiments, a daily limit cap (e.g., 10,000 SMS) on outgoing SMS texts may be enforced in all accounts, unless specifically increased by an administrator. The daily limit component sets a cap on the number of activities that can be processed within a 24-hour period, helping to prevent mass spam and fraudulent activities (e.g., after the ramp-up period) that may attempt to overwhelm the system with high volume activities in a short amount of time.

In various embodiments, such spam and fraud prevention can ensure that subscribers feel safer and more confident to combat the risk of fraudsters and spammers. Using the security features as described herein, a marketing agency, for example, can focus more on strategic capabilities on the product rather than combating the system from spammers, reducing manual effort to verify legitimate sign-ups. In short, it helps the agency to build faster on user centric needs and less worried of the spammers that can overwhelm the system.

Various manual or less technical alternatives can be implemented to enhance security and prevent fraud. Examples include: (1) manual review and verification, (2) Completely Automated Public Turing test to tell Computers and Humans Apart (CAPTCHA), (3) two-factor authentication (2FA), (4) account verification through customer support, and (5) user education and awareness. SaaS companies typically implement a manual review process where each sign-up is manually reviewed by a team member before granting access to the system. This process can involve verifying user information, checking for suspicious patterns or inconsistencies, and conducting additional verification steps, such as phone or email verification, to ensure the legitimacy of the sign-up. The CAPTCHA is a widely used technique that requires users to complete a challenge or task that can be easily solved by humans but is difficult for automated bots. This can help prevent automated spam sign-ups by verifying that the user is indeed a human and not a bot. Implementing 2FA as an additional layer of security can help prevent unauthorized access and fraudulent sign-ups. This can involve sending a verification code to the user's mobile device or email, which the user must enter during the sign-up process to verify their identity. SaaS companies also typically implement a process where users are required to contact customer support to verify their account before gaining access to the system. This can involve providing additional documentation or information to prove their identity and legitimacy. Educating users about the importance of secure sign-ups and how to protect their accounts can be an effective manual alternative. This can involve providing guidelines on creating strong passwords, avoiding sharing personal information, and being vigilant against phishing and social engineering attacks.

These manual or less technical alternatives may require additional effort and resources in terms of manual review and verification. They can be effective in preventing spam sign-ups and fraudulent activities, especially for small-scale operations or companies with limited technical capabilities. However, fast-growing companies may need additional measures to safeguard the system. Accordingly, embodiments of the tiered software system as disclosed herein include: enhanced security and reliability of the sign-up process with reduced manual effort; protection of certain subscribers from spam sign-ups, fake accounts, and other fraudulent activities; building trust among certain other subscribers, safeguarding their data and ensuring a secure environment for genuine users to engage with the SaaS platform; and enhancing competitive advantage of the various subscribers in the market.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" means a network of computing devices coupled together in a public, private, or hybrid communications network. Communication in the cloud network may use one or more wired, wireless, broadband, radio, and other kinds of communicative means. The Internet is an example of a cloud network.

As used herein, the term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, or functions according to the type of application.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

For convenience, if a collection of drawings designated with different letters are present (e.g., FIGS. 11A-11G), such a collection may be referred to herein without the letters (e.g., as "FIG. 11"). Similarly, if a collection of reference numerals designated with different letters are present (e.g., 106a, 106b), such a collection may be referred to herein without the letters (e.g., as "106") and individual ones in the collection may be referred to herein with the letters. Further, labels in upper case in the figures (e.g., 106A) may be written using lower case in the description herein (e.g., 106a) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Example Embodiments

FIG. 1 is a simplified block diagram illustrating an example spam blocking application 100 according to some embodiments of the present disclosure. In the example embodiment shown, spam blocking application 100 has three tiers: 102-1, 102-2, and 102-3. Note that the labeling convention followed herein uses the hyphen followed by a number to denote a separate tier corresponding to the number (e.g., "–1" denotes tier-1, "–2" denotes tier-2, and "–3" denotes tier-3). Spam blocking application 100 may be managed by a SaaS provider 104, who may provide one or more downstream subscriber 106-2 at tier 102-2 with access to spam blocking application 100. In turn, subscriber 106-2 may provide one or more downstream subscriber 106-3 at tier 102-3 with access to certain features of spam blocking application 100. SaaS provider 104 and subscribers 106 (e.g., 106-2 and 106-2) may include an entity (i.e., a company, an organization, etc.) in various embodiments. Human users at SaaS provider 104, and subscribers 106 may operate or otherwise use spam blocking application 100 through one or more devices such as computers, laptops, smartphones, mobile computing devices, mobile phones, iPads™, Google Droids™, Microsoft® Surface™, etc.

In various embodiments, a single one of SaaS provider 104 may have multiple subscribers 106-2 at tier 102-2; a single one of subscribers 106-2 at tier 102-2 may have multiple subscribers 106-3 at tier 102-3. Subscribers 106-2 may have accounts with SaaS provider 104 at tier 102-1; subscribers 106-3 may have accounts with subscribers 106-2 at tier 102-2. In various embodiments, SaaS provider 104 may bill subscribers 106-2; subscribers 106-2 in turn may bill subscribers 106-3. The billing at each tier 102 may be based on a variety of factors that may or may not be independent of each other, including application resources used by subscribers 106, number of individual users authorized by subscribers 106 to access spam blocking application 100, and other such factors beyond the scope of the present disclosure.

In various embodiments, spam blocking application 100 may determine that a message template 108 (or a message 110) is generated by one of subscribers 106-3 to send to prospects 112 targeted by subscriber 106-3. Note that the operations as described further may pertain to either message template 108 or message 110 as the case may be, even though only operations pertaining to message template 108 are described. In other words, wherever message template 108 is mentioned, it may be understood that the same may be applied to message 110 within the broad scope of the embodiments unless otherwise clarified.

A parser 114 may parse message template 108. A keyword filter 116 may filter message template 108 for keywords associated with regulated content, for example, by comparing a text of parsed message template 108 with the keywords. In various embodiments, the regulated content may comprise government regulations (e.g., S.H.A.F.T categories) and/or carrier guidelines (e.g., prohibiting dissemination of hate, marijuana distribution, gambling, etc.). For example, the regulated content may prohibit messages intending to sell or distribute marijuana or cannabidiol (CBD). The keywords in this instance may be "buy," "marijuana," and "CBD". Assume, merely for the sake of explanation and not as a limitation, that the text in message template 108 is "Destroy weeds using our great product." Keyword filter 116 may not find any keywords in the text. On the other hand, assume that the text is "Buy our CBD oil." In this case, the keywords "buy," and "CBD" are found, and message template 108 may be flagged. Responsive to finding the keywords in message template 108, a message blocker 118 may block generating any messages from message template 108. In embodiments where message 110 (rather than message template 108) is analyzed, message blocker 118 may block sending out message 110 when any keyword is discovered therein.

On the other hand, responsive to not finding any matches, an AI engine 120 may automatically perform a semantic search for the regulated content in parsed message template 108. In some embodiments, the semantic search may involve comparing semantics of the text of parsed message template 108 to semantics of the regulated content using a natural language processing (NLP) module 122 to find matches. NLP module 122 may use any suitable NLP models to perform the semantic search, including Bidirectional Encoder Representations from Transformers (BERT) (e.g., for text classification, sentiment analysis, and question answering), XLNet (e.g., using a permutation-based training approach and bidirectional context to improve language understanding), ROBERTa (e.g., a BERT model trained with different hyperparameters and a larger corpus of text), ALBERT (e.g., a lighter version of BERT using less computational resources, and using parameter-sharing techniques to achieve efficiency), Text-to-Text Transfer Transformer (T5) (e.g., T5 frames many NLP tasks as text-to-text problems), Bidirectional and Auto-Regressive Transformers (BART) (e.g., combining bidirectional and auto-regressive models for text generation, summarization, and text completion), Efficiently Learning an Encoder that Classifies Token Replacements Accurately (ELECTRA) (e.g., model in which generator and a discriminator are trained together to improve efficiency and performance), etc.

In some embodiments, the input for the semantic search may be provided by a prompt generated by a prompt generator 124 in AI engine 120 (e.g., the semantic search may be performed based on the prompt). Prompt generator 124 may use parsed message template 108 to generate the prompt in some embodiments. In other embodiments, prompt generator 124 may use the keywords of the regulated content to generate the prompt. In various other embodiments, Generative Pre-trained Transformer (GPT) models may be used by prompt generator 124 to generate the prompt. A score may be assigned to message template 108 based on any matches found. A score analyzer 126 in AI engine 120 may analyze the score and compare it with a predetermined threshold. Responsive to the score being higher than the predetermined threshold, message blocker 118 may block generating of any message from message template 108. In embodiments where message 110 (rather than message template 108) is analyzed, message blocker 118 may block sending out message 110 when the score is higher than the predetermined threshold.

For example, the prompt may be, "does the <text> indicate selling marijuana?" The <text> may be included from the text of message template 108 and combined with the keywords "selling" and "marijuana." Assume, merely for the sake of explanation and not as a limitation, that the text is "Destroy weeds using our great product." The semantic search may determine that although the keyword "selling" is not used in the text, the text suggests buying a product, and hence indicates selling, and therefore counts towards this matched semantics. The semantic search may also determine that "weed" is a colloquial term for "marijuana." However, the semantics of the text do not indicate use of the term "weed" as a synonym for "marijuana," and therefore, the semantic search may not count the term towards the score in some embodiments.

In various embodiments, the predetermined threshold, as also the keywords, may be generated by AI engine 120 using a machine learning module 128. Machine learning module 128 may use past data to generate the keywords and the predetermined threshold. Such past data may include feedback 130 obtained to various messages sent out previously by subscribers 106-3. A feedback module 132 may collect any feedback 130 received to the messages sent out and provide feedback 130 to machine learning module 128. In various embodiments, machine learning module 128 may also use past learning data to determine the appropriate algorithm to use to compute the score, to generate the prompt, to perform the semantic search, etc.

In some embodiments, if the score is lower than the predetermined threshold, messages may be allowed to be generated. Any feedback 130 received to such messages may be collected by feedback module 132 and provided to machine learning module 128, which may adjust the threshold in response to the feedback. Feedback 130 may be received from various sources, including prospects 112 who received the messages, the network carrier through whose communications network the messages were sent, and subscriber 106-2 that manages the account of message sender subscriber 106-3.

For example, assume that the message text, "Destroy weeds using our great product," was actually a satirical take on a CBD oil product, and the semantic search did not catch it as such. Feedback 130 may be received flagging the messages, for example, from one of the prospects 112, complaining about receiving the message. Feedback module 132 may provide feedback 130 to machine learning module 128. In one example, machine learning module 128 may adjust the learning models to take satirical semantics into account in future semantic searches (e.g., future messages containing similar satirical content may be flagged thereafter). In another example, the term "weed" may thereafter be assigned a higher score so that any message containing the term may be flagged for further analysis. In yet another embodiment, the prompt generated may be modified to capture additional details of the text to enhance the semantic search. Various other actions may be performed based on feedback 130 within the broad scope of the embodiments.

In some embodiments, responsive to determining that the score from the semantic search is less than the predetermine threshold, a limit module 134 may enforce a limit to the number of messages sent out by subscriber 106-3. In one example, a daily limit cap may be enforced for a plurality of subscribers 106-3, including substantially all subscribers 106-3. In an example, the daily limit cap may be 10,000 outgoing SMS from a single account. In another example, the daily limit cap may be 1000 outgoing email messages. Message blocker 118 may block sending of any messages exceeding the daily limit cap.

In some embodiments, each subscriber 106-3 may be whetted (e.g., verified) by a verification module 136 before being added as a subscriber to the tiered software framework. Verification module 136 may perform various verification operations to prevent fraudulent sign-ups, for example. After verification, a ramp module 138 may enforce daily limit caps that ramp-up from a low daily limit cap (e.g., 100 outgoing SMS) to the daily limit cap applicable across the tiered software framework (e.g., 10,000 outgoing SMS) over several days, for example, to prevent fraudulent sign-ups that intend to send out spam messages.

Spam blocking application 100 may interface with a variety of third-party tools 140 using appropriate third-party application programming interfaces (APIs) 142. Third-party tools 140 may include, by way of examples, and not as limitations, generative pre-trained transformer (GPT) tools 144, 3DS tools 146, email verification 148, IP address verification 150, and credit verification 152, among other tools. In one example, AI engine 120 may use GPT tolls 144 to generate prompts, or perform the semantic search. In such embodiments, prompt generator 124 may interface with GPT tools 144 through third-party API 142; likewise, NLP module 122 may interface with GPT tools 144 through third-party API 142.

When a new user signs up to become subscriber 106-3, relevant information such as the name of the user, business name, email address, phone number, and credit card details may be captured in a suitable intake form on user interface 154. User interface 154 may provide for three different menus 156 depending on tier 102 of the access credentials used to interact with user interface 154: tier-1 menu 156-1, tier-2 menu 156-2 and tier-3 menu 156-3. In various embodiments, the intake form may be provided on tier-3 menu 156-3. Measures may be implemented to prevent the use of burner emails or blacklisted domains that are flagged in an email partner system. For example, IP address verification 150 may verify that the IP address from where the request to sign-up is received is authentic and not fraudulent. To enhance security, the pin code (i.e., zip code) may be collected in the form and matched with the IP address region of the sign-up, as well as with the credit card address provided in the form. Email verification 148 may verify the email address provided in the sign-up form is authentic based on response from an email partner system. Credit card verification and address verification using a suitable third-party payment processor may be performed, for example, to ensure the authenticity of the credit card.

In some embodiments, credit verification 152 may comprise verification tools of a payment processor such as Stripe™, Paypal™, etc. Credit verification 152 may collect additional information about the user. Such additional information may include industry, niche, number of years in the industry, number of clients, company website, and EIN number if available. The third-party payment processing system's risk mitigation processes and tools may be used to block sign-ups from high-risk countries or geographies, for example, to prevent fake sign-ups. Sign-ups with a history of bad payment records and a risk score above a predetermined risk threshold (e.g., 60) or higher may also be blocked. Verification module 136 may also check for previously used fraudulent cards to prevent their reuse. After subscriber 106-3 signs up, the credit card provided in the intake form may be verified using 3DS technology by 3DS tools 146, for example, to ensure that the credit card is a working card and not stolen. After basic validation, error rates and opt-out rates are monitored, and based on severity of violation, the message sending capabilities of the account of subscriber 106-3 may be paused or suspended by message blocker 118.

Figure 2:
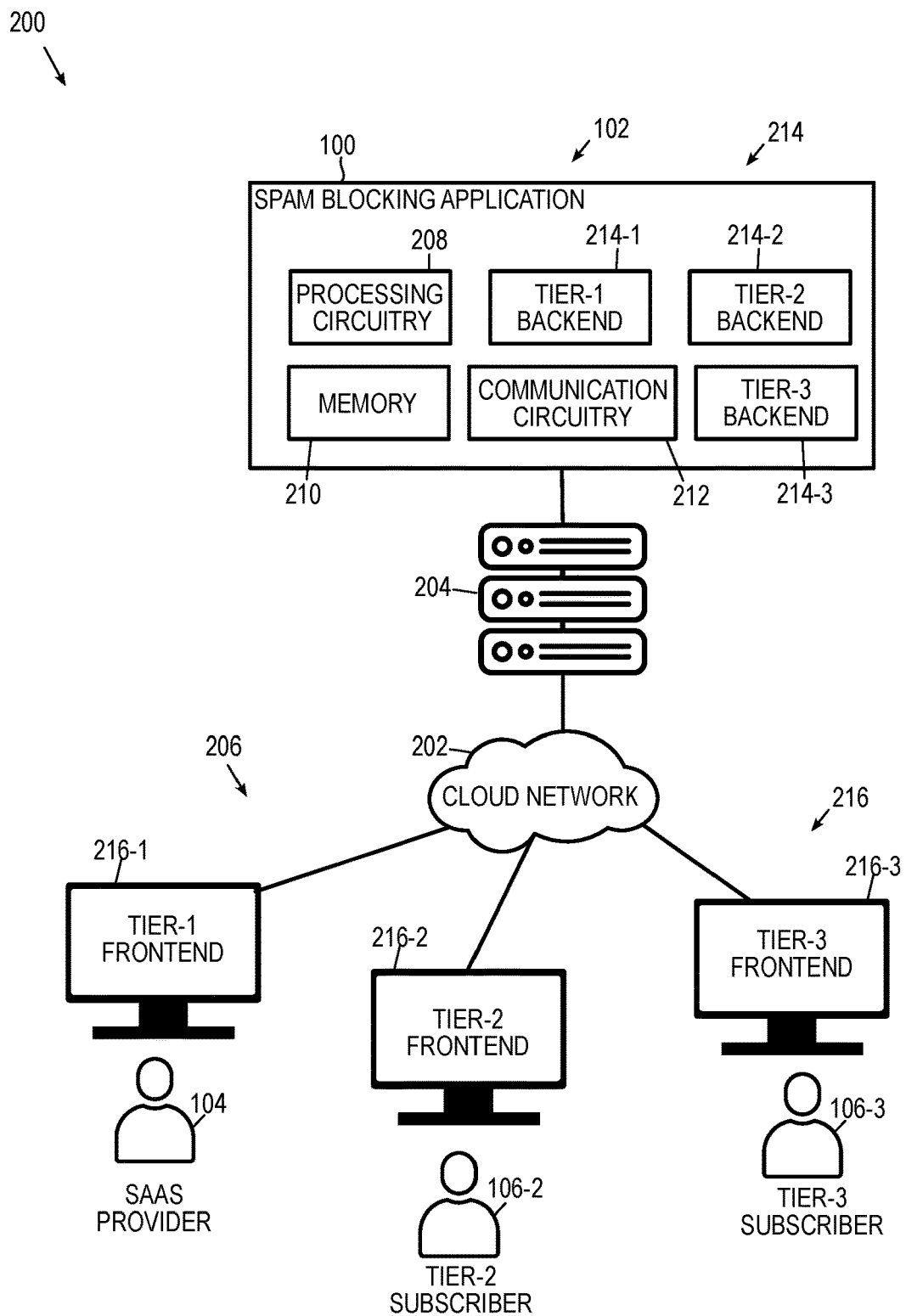
FIG. 2 is a simplified block diagram illustrating example details of the tiered software framework implementing the systems and methods for facilitating spam blocking in a tiered software framework, according to some embodiments of the present disclosure.

FIG. 2 is a simplified block diagram illustrating a tiered software framework 200 according to various embodiments. In example implementations, at least some portions of the activities outlined herein may be hosted on a cloud network 202 in one or more servers 204. At least some other portions of the activities outlined herein may be implemented in one or more computing devices 206 connected over one or more communication networks with cloud network 202. In particular embodiments, cloud network 202 is a collection of hardware devices and executable software forming a shared pool of configurable computing resources (e.g., networks, servers, storage, applications, services, etc.) that may be suitably provisioned to provide on-demand self-service, network access, resource pooling, elasticity and measured service, among other features. Computing device 206 may have any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, or a wearable computing device.

Certain portions of tiered software framework 200 (e.g., spam blocking application 100) may execute using a processing circuitry 208, a memory 210 and communication circuitry 212 (among other components) in one or more servers 204. Certain other portions of tiered software framework 200 may execute in one or more computing devices 206 using respective processing circuitry, memory, and communication circuitry (not shown with particularity so as not to clutter the drawing) substantially similar in functionalities to processing circuitry 208, memory 210 and communication circuitry 212. In some embodiments, one or more of these features may be implemented in hardware, provided external to these elements, or consolidated in any appropriate manner to achieve the intended functionality. The various network elements in tiered software framework 200 may include communication software that can coordinate to achieve the operations as outlined herein. In still other embodiments, these elements may include any suitable algorithms, hardware, software, components, modules, interfaces, or objects that facilitate the operations thereof.

Processing circuitry 208 may execute any type of instructions associated with data stored in memory 210 to achieve the operations detailed herein. In one example, processing circuitry 208 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 210 may store data used for the operations described herein. This includes memory 210 storing instructions (e.g., software, logic, code, etc.) in non-transitory media (e.g., random access memory (RAM), read only memory (ROM), FPGA, EPROM, etc.) such that the instructions are executed to carry out the activities described in this disclosure based on particular needs. In some embodiments, memory 210 may comprise non-transitory computer-readable media, including one or more memory devices such as volatile memory such as dynamic RAM (DRAM), nonvolatile memory (e.g., ROM), flash memory, solid-state memory, and/or a hard drive. In some embodiments, memory 210 may share a die with processing circuitry 208. Memory 210 may include algorithms, code, software modules, and applications, which may be executed by processing circuitry 208. The data being tracked, sent, received, or stored in tiered software framework 200 may be provided in any database, register, table, cache, queue, control list, or storage structure, based on particular needs and implementations, all of which could be referenced in any suitable timeframe.

Communication circuitry 212 may be configured for managing wired or wireless communications for the transfer of data in tiered software framework 200. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 212 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 212 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 212 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 212 may operate in accordance with other wireless protocols in other embodiments. Communication circuitry 212 may include antennas to facilitate wireless communications and/or to receive other wireless communications.

In some embodiments, communication circuitry 212 may manage wired communications, such as electrical, optical, or any other suitable communication protocols (e.g., the Ethernet, Internet). Communication circuitry 212 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

Spam blocking application 100 may be implemented in tiered software framework 200 comprising at least three tiers 102: tier-1 (102-1), tier-2 (102-2), and tier-3 (102-3). Tiers 102 may be organized according to a hierarchy of management (i.e., to oversee, to control, to maintain), with upstream tiers managing downstream ones. Thus, tier 102-1 comprises operations that may manage tiers 102-2 and 102-3, whereas tier 102-2 comprises operations that may manage tier 102-3 but not tier 102-1. For purposes of terminology, tier 102-1 is "upstream" relative to tiers 102-2 and 102-3; tier 102-3 is "downstream" relative to tiers 102-2 and 102-1; tier 102-2 is downstream relative to tier 102-1 and upstream relative to tier 102-3. In some embodiments, each tier 102 may interact with the tier immediately adjacent thereto (e.g., downstream or upstream) but not with non-adjacent tiers. In some other embodiments, any tier 102 may interact with any other tier. In an example embodiment, tier 102-3 comprises marketing activities by business locations such as a dentist's office, a plumber's business, etc.; tier 102-2 comprises software operations by one or marketing agencies whose customers are the business locations of tier 102-3; and tier 101-1 comprises software operations by SaaS provider 104 whose customers are the marketing agencies of tier 102-2.

In various embodiments, tiers 102 may be partitioned into a backend 214 and a frontend 216. Backend 214 may comprise tier-1 backend 214-1, tier-2 backend 214-2, and tier-3 backend 214-3 provisioned in one or more servers 204. Likewise, frontend 216 may comprise tier-1 frontend 216-1, tier-2 frontend 216-2, and tier-3 frontend 216-3 provisioned in one or more computing devices 206. Backend 214 may comprise various modules, logic, software engines and other components that are distributed (and common) across all users of tiered software framework 200. Backend 214 may execute operations for managing and processing data, performing computations, and facilitating communication between different components, such as components of spam blocking application 100. In particular embodiments, backend 214 may include operations such as data management, business logic (e.g., spam blocking application 100), user authentication and authorization, security and validation, application programming interfaces (APIs) with third-party components such as payment processors, etc. In various embodiments, various components of spam blocking application 100, including AI engine 120, may operate in backend 214 with data spread across all tiers 102-1, 102-2 and 102-3.

In a general sense, frontend 216 comprises at least user interface 154 using which users interact with tiered software framework 200. Frontend 216 may also include libraries, forms, device integrators and other components as desired and based on particular needs. Frontend 216 may be presented on a suitable display device coupled to computing device 206 and appropriate to show visual indicators, such as a heads-up display, a computer monitor, a projector, a touchscreen display, a liquid crystal display (LCD), a light-emitting diode display, and/or a flat panel display. In various embodiments, frontend 216 may be specific to the particular one of tier 102. For example, frontend 216-1 at tier-1 may comprise certain functionalities available (and visible) only to SaaS provider 104. Frontend 216-2 at tier-2 may comprise certain functionalities available (and visible) only to tier-2 subscriber 106-2. Frontend 216-3 at tier-3 may comprise certain functionalities available (and visible) only to tier-3 subscriber 106-3.

Tiered software framework 200 described and shown herein (and/or its associated structures) may also include suitable interfaces for receiving, transmitting, and/or otherwise communicating data or information in a network environment. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Figure 3:
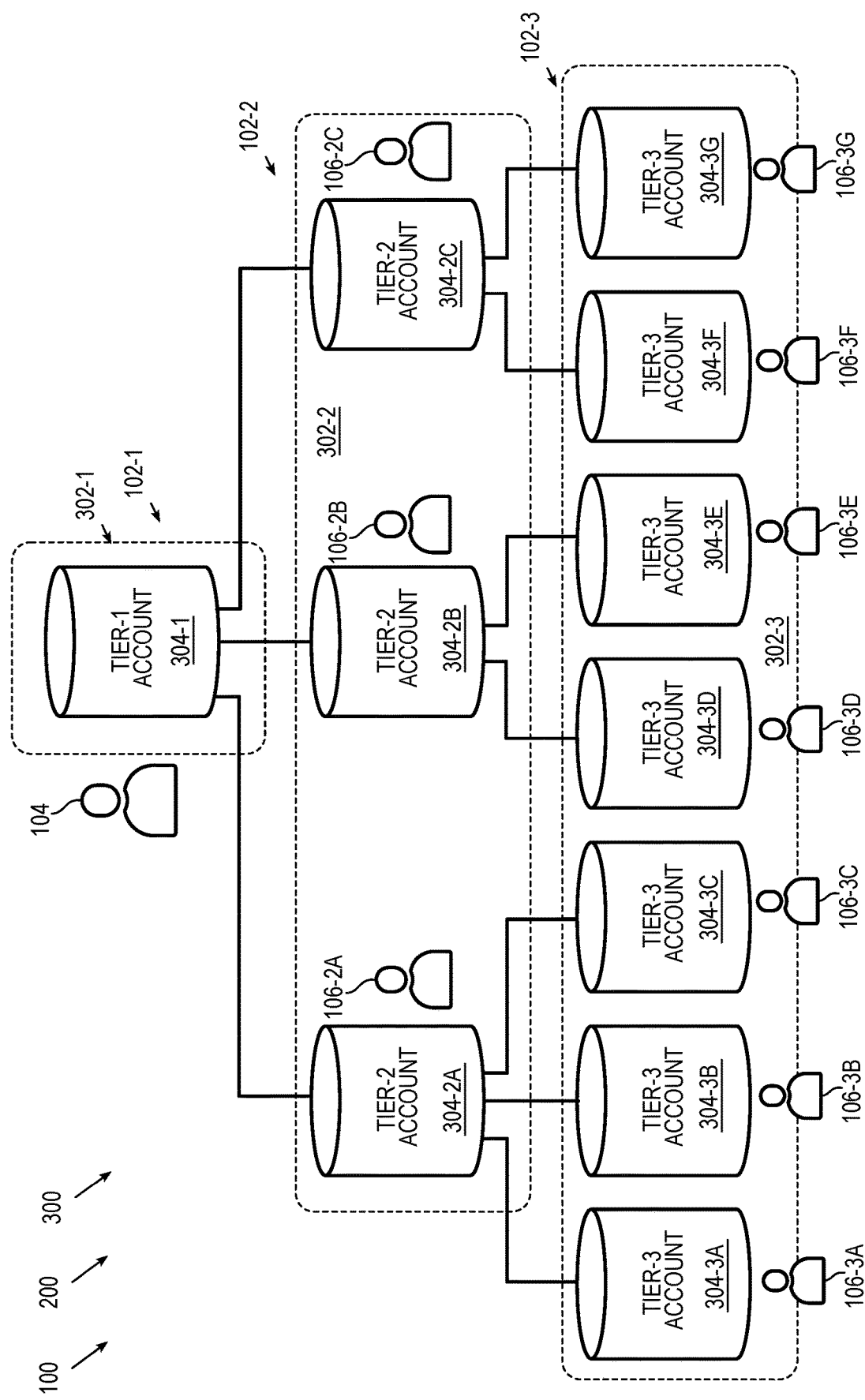
FIG. 3 is a simplified block diagram illustrating other example details of the tiered software framework implementing the systems and methods for facilitating spam blocking in a tiered software framework, according to some embodiments of the present disclosure.

FIG. 3 is a simplified block diagram illustrating example details of data hierarchy 300 of tiered software framework 200 implementing spam blocking application 100, according to some embodiments of the present disclosure. In various embodiments, data 302 communicated in tiered software framework 200 may be exclusively received from users such as SaaS provider 104 and subscribers 106-2, and 106-3; in some other embodiments, data 302 may also be received from other sources, such as third parties and/or from the Internet. Examples of data 302 include business niche targeted by subscribers 106, marketing activities such as on social media, target audience of subscribers 106, login credentials to access various marketing platforms, frequency of marketing activities, information to be included in the content of marketing posts, customer lists, business locations, marketing platform rules, and other such data relevant to the functionalities offered by tiered software framework 200. Data 302 may be stored in data lakes, databases, data warehouses, blockchains, file systems and other types of data storage facilities within the broad scope of the embodiments with corresponding accessing and viewing capabilities as described herein.

Data 302 in each tier 102 may be contained within accounts 304 accessible and viewable with appropriate access credentials. For example, account 304-1 may be associated with SaaS provider 104. Account 304-1 may manage a plurality of accounts 304-2 at tier 102-2. Subscriber 106-2a may have a subscription to account 304-2a in plurality of accounts 304-2. Account 304-2a may manage a plurality of accounts 304-3 at tier 102-3. Subscriber 106-3a may have a subscription to account 304-3a in plurality of accounts 304-3; subscriber 106-3b may have a subscription to account 304-3b in plurality of accounts 304-3; and subscriber 106-3c may have a subscription to account 304-3c in plurality of accounts 304-3. In other words, subscriber 106-2*a* has three downstream subscribers at tier 102-3, namely subscribers 106-3*a*, 106-3*b*, and 106-3*c* with their associated respective accounts 304-3*a*, 304-3*b*, and 304-3*c*. Likewise for other accounts shown in the figure. Note that such a framework is merely provided for illustrative purposes and should not be construed as a limitation. Any number of subscribers may be provided at tiers 102-2 and 102-3 in tiered software framework 200 within the broad scope of the embodiments. Note also that the labeling convention followed herein uses letters to denote a separate instance of the same component (e.g., "a" denotes instance A, "b" denotes instance B, and so on).

Downstream accounts may also be called "subaccounts" relative to the immediately upstream accounts in this disclosure. For example, accounts 304-3 are subaccounts relative to accounts 304-2. In the specific example shown, accounts 304-3*a* . . . 304-3*c* are subaccounts of account 304-2*a*; accounts 304-3*d* and 304-3*e* are subaccounts of account 304-2*b*; accounts 304-3*f* and 304-3*g* are subaccounts of account 304-2*c*. Likewise, accounts 304-2*a* . . . 304-2*c* are subaccounts of account 304-1.

In various embodiments, data 302 may be arranged in data hierarchy 300 for different accounts 304 such that certain users can view and access only a subset of data 302 according to their respective tier 102 and access credentials based on particular needs (e.g., user credentials may indicate which tier 102 and which corresponding accounts 304 are available for access and view). Such accounts 304 may be facilitated by a suitable user interface at frontend 216 for viewing the accessible data. Appropriate user authentication and authorization engines running in backend 214 may ensure that accounts 304 are maintained as desired and appropriate privacy blocks are applied at appropriate tiers 102.

In the example illustrated herein, tier-1 data 302-1 may be of account 304-1; tier-2 data 302-2 may be of accounts 304-2*a*, 304-2*b* and 304-2*c* corresponding to subscribers 106-2*a*, 106-2*b* and 106-2*c*, respectively; tier-3 data 302-3 may be of accounts 304-3*a* . . . 304-3*g* corresponding to subscribers 106-3*a* . . . 106-3*g*. Subscribers 106-3*a* . . . 106-3*g* may access and view their own respective accounts 304-3*a* . . . 304-3*g*; however, they cannot access or view other accounts 304 in the same tier 102-3 or in upstream tiers 102-2 or 102-1. Note that accessing and viewing an account refers to accessing and viewing the data of the account. Subscribers 106-2*a* . . . 106-2*c* at tier 102-3 may access and view their own respective accounts 304-2*a* . . . 304-2*c* as well as downstream accounts 304-3 of their respective subscribers 106-3; however, they cannot access or view other accounts 304-2 in the same tier 102-2, or in downstream tier 102-3 not associated with their downstream subscribers 106-3, or in upstream tier 102-1. For example, subscriber 106-2*a* may access and view accounts 304-2*a*, 304-3*a*, 304-3*b*, and 304-3*c*; subscriber 106-2*b* may access and view accounts 304-2*b*, 304-3*d*, and 304-3*e*; subscriber 106-2*c* may access and view accounts 304-2*c*, 304-3*f*, and 304-3*g*. SaaS provider 104 at tier 102-1 may access and view accounts 304-1 at tier 102-1, 304-2*a* . . . 304-2*c* at tier 102-2, and 304-3*a* . . . 304-3*g* at tier 102-3.

Figure 4:
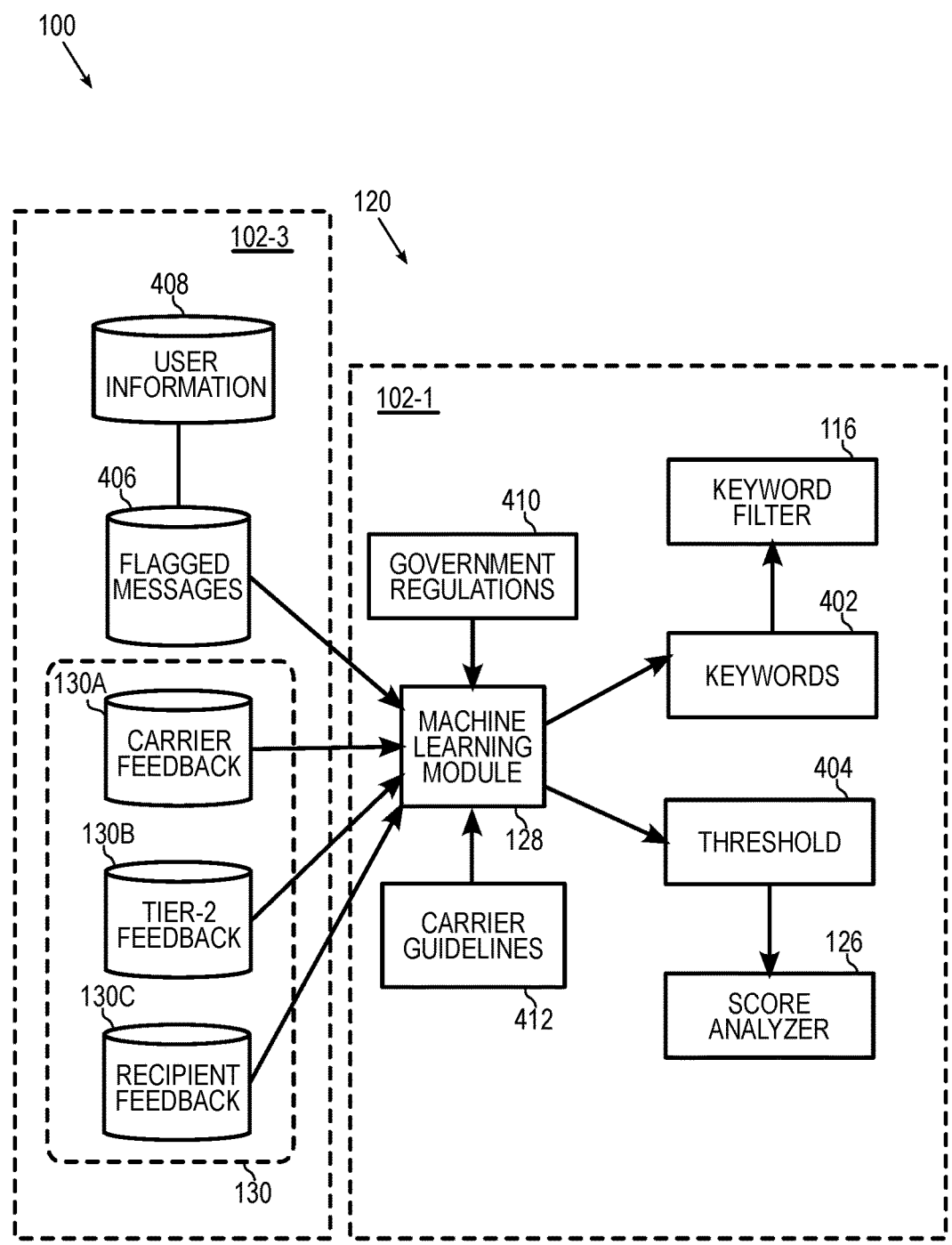
FIG. 4 is a simplified block diagram illustrating example details of the spam blocking application, according to some embodiments of the present disclosure.

FIG. 4 is a simplified block diagram illustrating example details of spam blocking application 100 according to various embodiments. Machine learning module 128 may use various inputs to generate keywords 402 and threshold 404. The inputs may include feedback 130, comprising, for example, carrier feedback 130*a*, tier-2 feedback 130*b* (e.g., from subscriber 106-2 managing account of subscriber 106-3), and recipient feedback 130*c*. Such feedback 130 may be previously received and stored in tiered software framework 200. The inputs may further include previously flagged messages 406, stored along with other user information 408. The inputs may also include government regulations 410 and carrier guidelines 412.

In various embodiments, machine learning module 128 may generate keywords 402 for keyword filter 116. Keywords 402 may be generated in some embodiments from government regulations 410 and/or carrier guidelines 412 exclusively. In other embodiments, keywords 402 may be generated from government regulations 410 and/or carrier guidelines 412 and then adjusted using learning algorithms based on feedback 130 and information about flagged messages 406. For example, the regulated content as provided in government regulations 410 and carrier guidelines 412 may prohibit messages intending to sell or distribute marijuana or CBD. Keywords 402 in this instance may be "buy," "marijuana," and "CBD" may be obtained from government regulations 410 and/or carrier guidelines 412. Assume, merely for the sake of explanation that previously, certain messages containing the word "weed" had been flagged. Information about such flagged messages 406 may be obtained by machine learning module 128 and keywords 402 adjusted to include "weed" in addition to "buy" "marijuana" and "CBD." Keyword filter 116 may parse message template 108 (or message 110) using keywords 402 to find any matches.

Machine learning module 128 may include any suitable probabilistic model, including more than one model, such as: Bayesian Linear Regression, Gaussian Processes, Bayesian Neural Networks, Probabilistic Graphical Models, Hidden Markov Models, Variational Autoencoders, Monte Carlo Methods, Dirichlet Process Mixture Models, Copula Models, Probabilistic Context-Free Grammars, Bayesian Nonparametrics, and Quantile Regression. In various embodiments, threshold 404 may be calculated to prevent false positives, whereas false negatives may be allowed to pass through. In general, a true positive is an outcome where the model correctly predicts the positive class (i.e., message template 108 includes regulated content). Similarly, a true negative is an outcome where the model correctly predicts the negative class (e.g., message template 108 does not include regulated content). A false positive is an outcome where the model incorrectly predicts the positive class (i.e., AI engine 120 determines that message template 108 includes regulated content when in fact, it does not). A false negative is an outcome where the model incorrectly predicts the negative class (i.e., AI engine 120 determines that message template 108 does not include regulated content when in fact, it does).

In various embodiments, false negatives may be caught by carrier spam blockers, tier-2 subscribers 106-2 managing subaccount 304-3 that generated the message, and/or message recipients, and the information relayed back to AI engine 120 via feedback 130. Thus, false negatives may be useful to improve the models used by machine learning module 128. False positives, on the other hand, can render the system not user friendly, leading to customer frustration. For example, a message that is erroneously flagged and blocked even though it does not contain any regulated content may result in subscriber 106-3 leaving, leading to business loss. Hence, the sensitivity of the models used by machine learning module 128 may be tailored to reduce false positives.

Machine learning module 128 may use any available probabilistic model to calculate threshold 404. In some embodiments, AI engine 120 may send the prompt to third-party GPT tools 144 and request a score in return. The prompt may include all the factors necessary to compute the score. Machine learning module 128 may natively calculate a corresponding score using the same prompt and compare with the score returned by GPT tools 144. A difference in the scores by the two different processes may trigger revisiting the models in machine learning module 128 appropriately to tweak threshold 404. In some embodiments, a heuristic score (e.g., 7.5) may be provided as a benchmark to compare against (instead of using GPT tools 144). In some embodiments, score analyzer 126 may also calculate the score for message template 108 and compare with the score returned by GPT tools 144. A difference in values may trigger adjusting the models used by score analyzer 126 to compute the score.

In various embodiments, the score computed by score analyzer 126 may reflect a risk level of message template 108 (i.e., higher the score, higher is the risk that the text of message template 108 includes the regulated content). Score analyzer 126 may use any suitable mathematical model for assigning scores to the text of parsed message template 108. Examples of such models include Bag of Words (BoW) (e.g., assign scores based on the presence or absence of specific words or phrases), Term Frequency-Inverse Document Frequency (TF-IDF) (e.g., model that considers not only word frequency but also the importance of words relative to their occurrence across the entire corpus), Word Embeddings, Naive Bayes Classifier, Support Vector Machines (SVM), Recurrent Neural Networks (RNN), Convolutional Neural Networks (CNN), Bidirectional Encoder Representations from Transformers (BERT) based models, Reinforcement Learning (e.g., assigning scores based on feedback 130), and transformer-based language models such as GPT.

In various embodiments, feedback 130 and user information 408, including information pertaining to previously flagged messages 406 may be associated with subaccounts 304-3 in tier 102-3. Thus, such data in each subaccount 304-3 may be insulated from access by other subaccounts 304-3. However, machine learning module 128 may operate at tier 102-1, and thereby have access to substantially all data in subaccounts 304-3. As a result, the data used by learning models therein may be broader, deeper and more precise that any other machine learning model that has access to only data in any one subaccount 304-3.

Although the present disclosure has been described in detail with reference to particular arrangements and configurations, these example configurations and arrangements may be changed significantly without departing from the scope of the present disclosure. For example, although the present disclosure has been described with reference to particular network systems such as cloud networks, spam blocking application 100 may be implemented in other networks such as LANs. Moreover, although tiered software framework 200 has been illustrated with reference to particular elements and operations that facilitate the software process, these elements, and operations may be replaced by any suitable architecture or process that achieves the intended functionality of spam blocking application 100.

Example Methods

Figure 5:
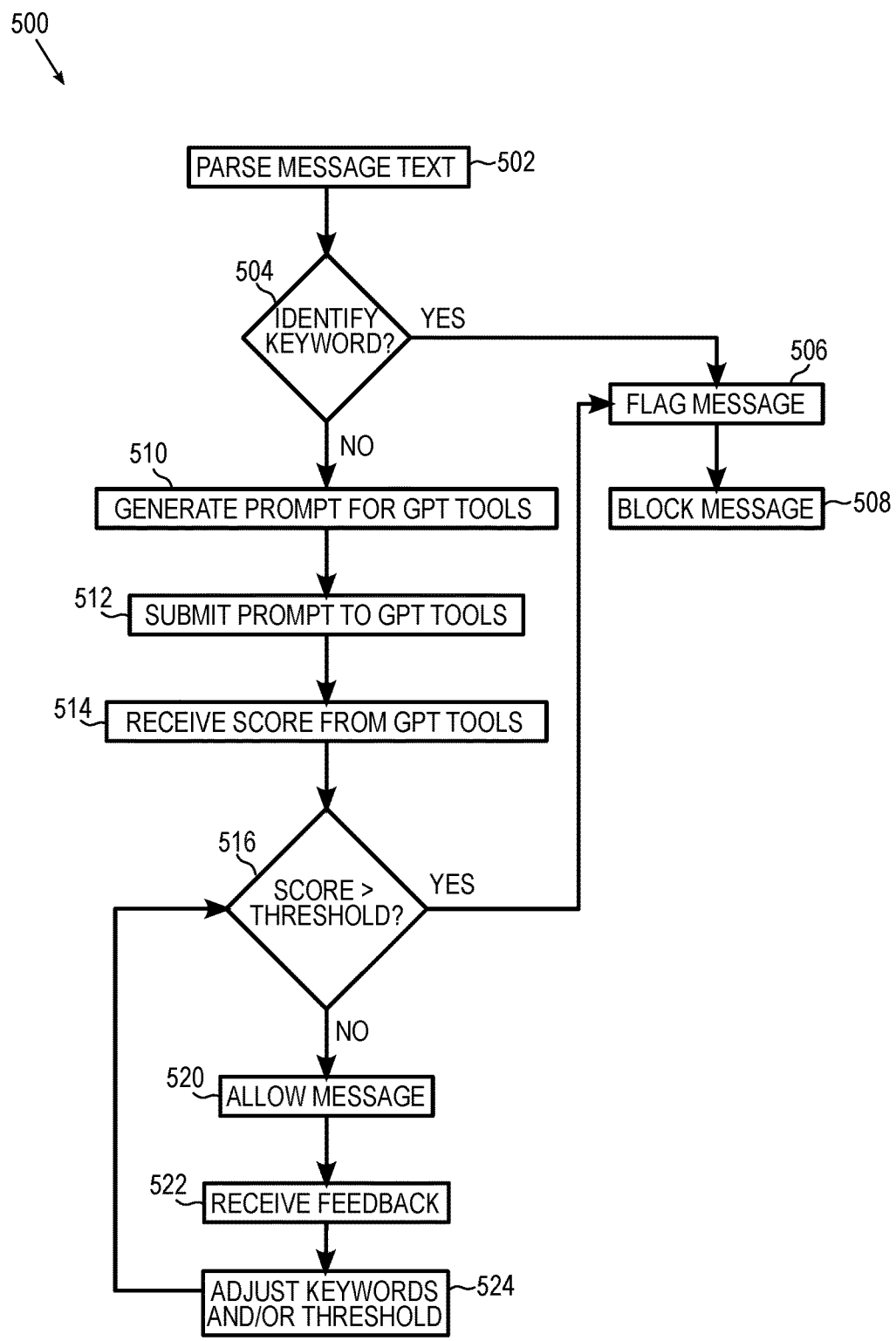
FIG. 5 is a simplified flow diagram illustrating example operations associated with the spam blocking application, according to some embodiments of the present disclosure.

FIG. 5 is a simplified flow diagram illustrating example operations 500 that may be associated with spam blocking application 100 according to various embodiments. At 502, text of message 110 (or message template 108 as the case may be) is parsed by parser 114. At 504, a determination may be made whether keyword 402 is identified in the text. If yes, at 506, message 110 (or message template 108 as the case may be) may be flagged. At 508, message 110 may be blocked from being sent. In embodiments where message template 108 is being analyzed, messages may be blocked from being generated using message template 108. Turning back to operation 504, if it is determined that the text does not contain any keywords 402, at 510, a prompt may be generated by prompt generator 124 for GPT tools 144. At 512, the prompt may be submitted to GPT tools 144 using third-party API 142. At 514, a score may be received from GPT tools 144. At 516, a determination may be made whether the score exceeds threshold 404. If yes, the operations step to 506 and continues thereafter. If not (i.e., the score does not exceed threshold 404) at 520, message 110 may be allowed to be sent. In embodiments where message template 108 is being analyzed, messages may be allowed to be generated using message template 108. At 522, feedback 130 may be received by feedback module 132. Based on feedback 130, keywords 402 and/or threshold 404 may adjusted accordingly.

Figure 6:
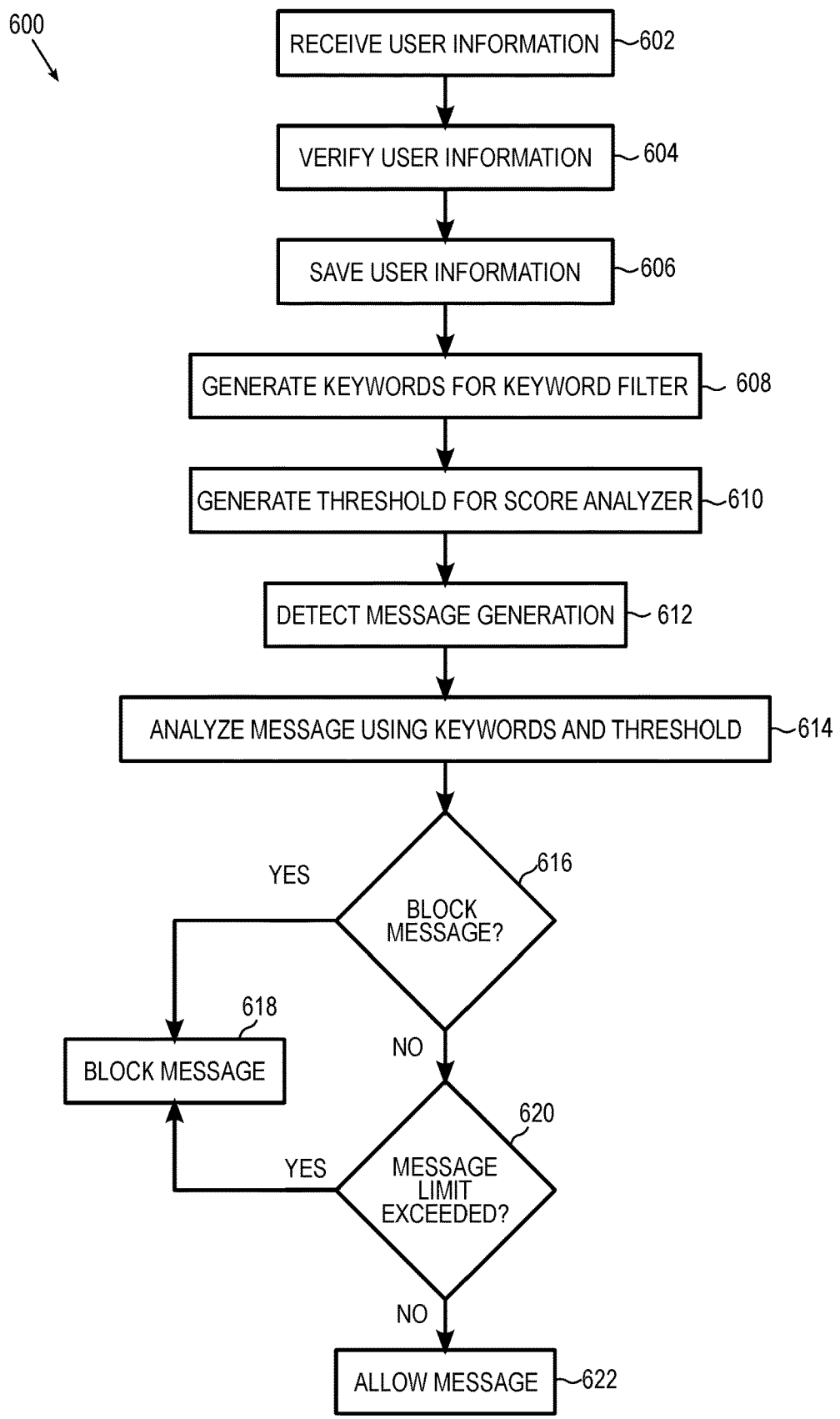
FIG. 6 is a simplified flow diagram illustrating other example operations associated with the spam blocking application, according to some embodiments of the present disclosure.

FIG. 6 is a simplified flow diagram illustrating example operations 600 that may be associated with spam blocking application 100 according to various embodiments. At 602, user information may be received at tiered software framework 200 through an intake form on user interface 154. At 604, the user information may be verified. For example, email verification 148 may verify, using a trusted email partner system, that the email provided in the intake form exists. IP address verification 150 may compare the geographical region associated with the IP address from where the intake form was received with the address associated with the credit card information in the intake form. Credit verification 152 may pull up various third-party payment processor systems and verify that the credit card information provided in the intake form is valid and not stolen or fraudulent. 3DS tools 146 may perform further credit card verification checks to authenticate the credit card and the user. At 606, the information may be stored as user information 408.

At 608. keywords 402 may be generated by machine learning module 128 as described previously. At 610 threshold 404 may be generated by machine learning module 128 as described previously. At 612, spam blocking application 100 may detect message generation either as message template 108 or message 110. At 614, message template 108 (or message 110 as the case may be) may be analyzed using keywords 402 and threshold 404 as described previously. At 616, a determination may be made whether to block message template 108 (or message 110 as the case may be). Blocking may be performed at 618. Blocking may include preventing generation of any messages from message template 108, or preventing sending of messages 110. If blocking is not to be performed, at 620, a determination may be made whether the message limit is exceeded. The message limit may be based on a ramp for new subscribers 106-3, or may be a daily limit cap applicable to substantially all subscribers 106-3 in tiered software framework 200. If the message limit is exceeded, the message may be blocked at 618 as described previously. If not, the message may be allowed at 622. Allowing the message may include sending message 110 or allowing generation of messages from message template 108 as the case may be.

Figure 7:
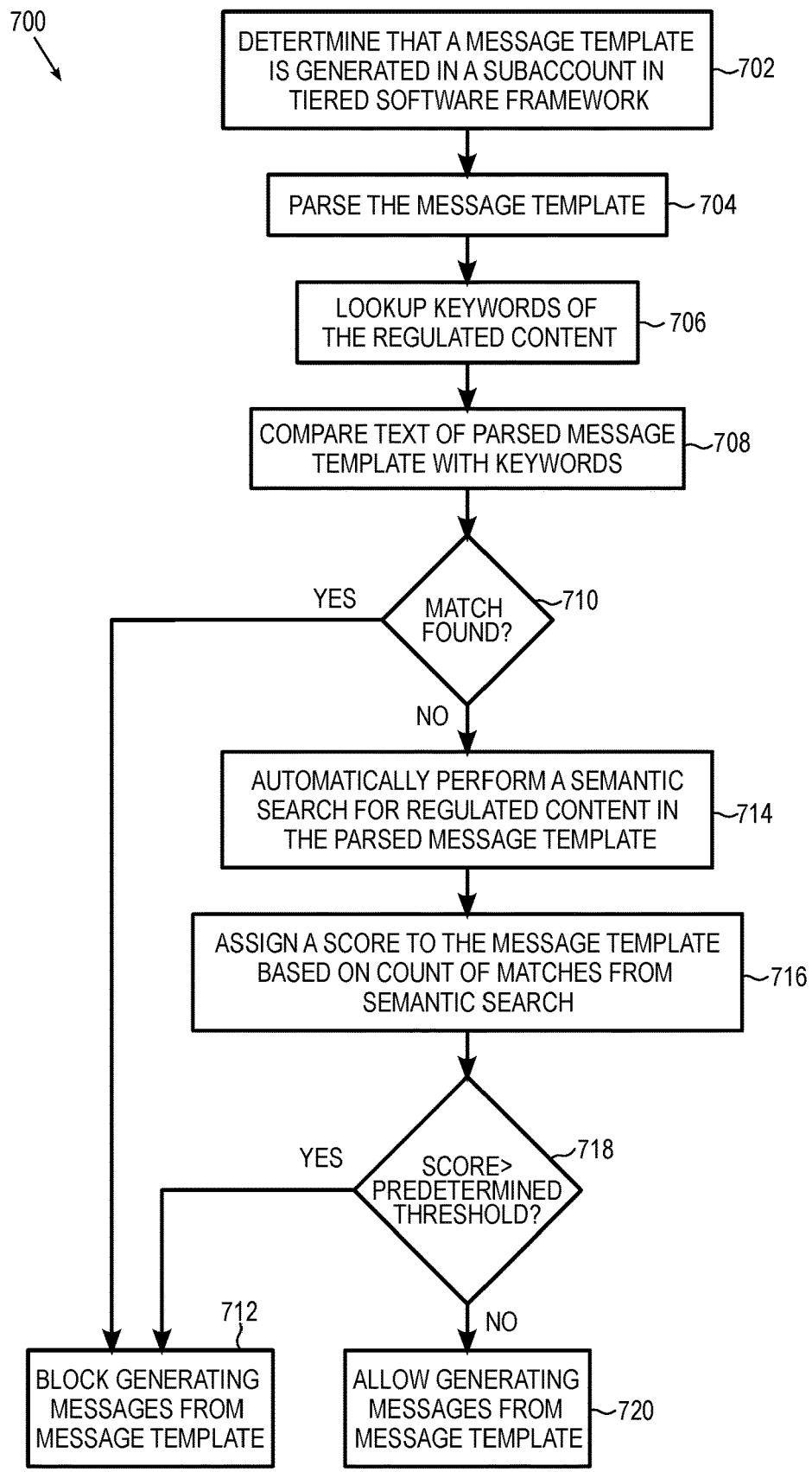
FIG. 7 is a simplified flow diagram illustrating yet other example operations associated with the spam blocking application, according to some embodiments of the present disclosure.

FIG. 7 is a simplified flow diagram illustrating example operations 700 that may be associated with spam blocking application 100 according to various embodiments. At 702, spam blocking application 100 may determine that message template 108 (or message 110 as the case may be) is generated in subaccount 304-3 of tiered software framework 200. At 704, parser 114 may parse message template 108. At 706, keyword filter 116 may look up keywords 402 indicative of the regulated content. At 708, keyword filter 116 may compare the text of parsed message template 108 with keywords 402. At 710, a determination may be made whether a match is found. If a match is found, at 712, message blocker 118 may block generating messages from message template 108.

At 710, if a match is not found, at 714, AI engine 120 may automatically perform a semantic search for the regulated content in parsed message template 108. In various embodiments, performing the semantic search comprises: comparing semantics of the text of parsed message template 108 to semantics of the regulated content using NLP to find matches. At 716, score analyzer 126 in AI engine 120 may assign a score to message template 108 based on any matches returned (e.g., found) from the semantic search. At 718, a determination may be made whether the score is higher than predetermined threshold 404. If yes, the operations may step to 712. If not, at 720, spam blocking application 100 may allow generating messages from message template 108.

Figure 8:
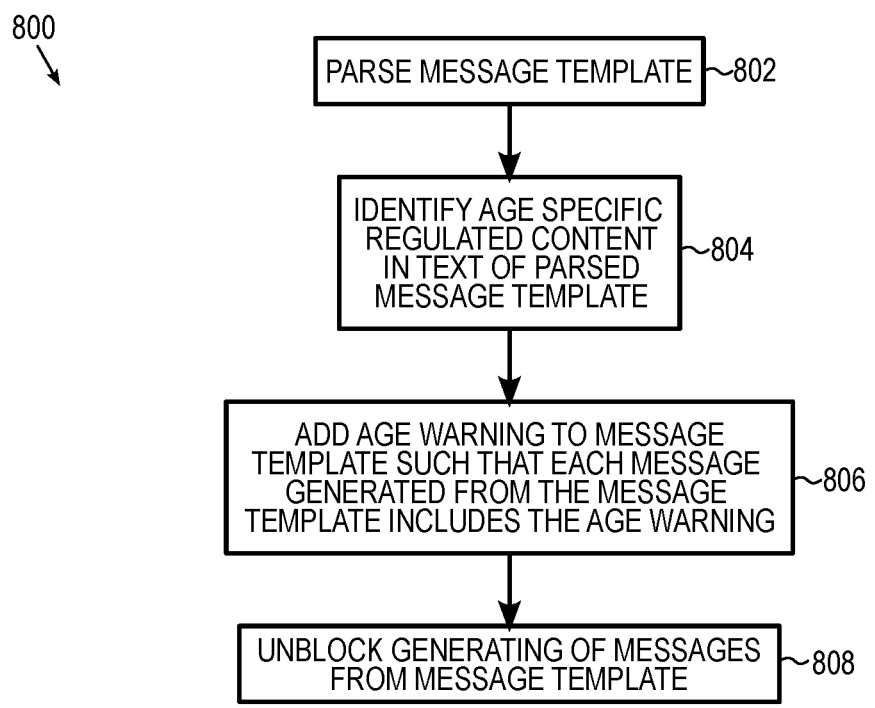
FIG. 8 is a simplified flow diagram illustrating yet other example operations associated with the spam blocking application, according to some embodiments of the present disclosure.

FIG. 8 is a simplified flow diagram illustrating example operations 800 that may be associated with spam blocking application 100 according to various embodiments. At 802, message template 108 may be parsed. At 804, age-specific regulated content may be identified in the text of parsed message template 108. At 806, an age warning may be added to message template 108 such that each message generated from message template 108 includes the age warning. At 808, spam blocking application 100 may unblock generating of messages from message template 108.

In various embodiments, the operations described in FIGS. 5-8 are performed automatically without human intervention. Although FIGS. 5-8 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 5-8 may be modified in accordance with the present disclosure to facilitate spam blocking in tiered software framework 200 as disclosed herein. Although various operations are illustrated in FIGS. 5-8 once each, the operations may be repeated as often as desired.

It is important to note that the operations described with reference to the preceding figures illustrate only some of the possible scenarios that may be executed by, or within, spam blocking application 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

Select Examples

Example 1 provides a method for automatically facilitating spam blocking in a tiered software framework, the method comprising: determining that a message template is generated in the tiered software framework, in which: the tiered software framework comprises a first tier, a second tier, and a third tier, the second tier comprises accounts of a first plurality of subscribers, the third tier comprises subaccounts of the accounts, the subaccounts associated with a second plurality of subscribers, and the message template is associated with one of the subaccounts in the third tier; parsing the message template; automatically performing a semantic search for regulated content in the parsed message template by comparing semantics of the text of the parsed message template to semantics of the regulated content using natural language processing to find matches; assigning a score to the message template based on any matches found; and responsive to the score being higher than a predetermined threshold, blocking generating of any message from the message template.

Example 2 provides the method of example 1, in which the message template is to generate messages to prospects targeted by at least one subaccount of the one of the accounts.

Example 3 provides the method of any one of examples 1-2, in which: the regulated content is age-specific, and the method further comprises: responsive to identifying text in the message template that corresponds to age-specific regulated content, adding an age warning to the message template such that each message generated using the message template includes the age warning; and unblocking generating of any messages from the message template.

Example 4 provides the method of any one of examples 1-3, in which the regulated content comprises: a first set of content regulated by government regulations; and a second set of content regulated by network carrier guidelines.

Example 5 provides the method of any one of examples 1-4, further comprising: reviewing feedback to the messages sent using the message template; and responsive to the feedback, adjusting the predetermined threshold.

Example 6 provides the method of example 5, in which the feedback is received from at least one of the following: (i) recipients of the messages, (ii) network carrier, and (iii) account to which the one of the subaccounts is a subscriber.

Example 7 provides the method of any one of examples 1-6, further comprising: before performing the semantic search, looking up keywords of the regulated content; comparing a text of the parsed message template with the keywords; and responsive to not finding any matches, automatically performing the semantic search.

Example 8 provides the method of example 7, further comprising: responsive to finding a match, blocking generating of any message from the message template without performing the semantic search.

Example 9 provides the method of any one of examples 1-8, in which automatically performing the semantic search further comprises: generating a prompt for a natural language processing module, in which the semantics of the text of the parsed message template is compared to the semantics of the regulated content based on the prompt.

Example 10 provides the method of any one of examples 1-9, further comprising: flagging the message template.

Example 11 provides the method of any one of examples 1-10, further comprising: determining that a message associated with the one of the subaccounts is generated without the message template; performing the semantic search on the message generated without the message template; and assigning another score to the message based on any matches returned by the semantic search; and responsive to the another score being higher than the predetermined threshold, blocking sending of the message from the one of the subaccounts.

Example 12 provides the method of any one of examples 1-11, further comprising: generating the predetermined threshold based on feedback received in response to a plurality of messages sent from a plurality of subaccounts.

Example 13 provides the method of any one of examples 1-12, further comprising: responsive to the score being lower than a predetermined threshold, limiting a number of messages generated from the message template to less than another predetermined threshold.

Example 14 provides the method of example 13, in which: the another predetermined threshold varies according to a number of days that the one of the subaccounts has been subscribed to the tiered software framework, and the another predetermined threshold is higher as the number of days is higher.

Example 15 provides the method of any one of examples 13-14, in which the another predetermined threshold is a daily limit cap applied on a plurality of subaccounts in the tiered software framework.

Example 16 provides non-transitory computer-readable tangible media that includes instructions for execution, which when executed by a processor of a computing device, is operable to perform operations comprising: determining that a message template is generated in the tiered software framework, in which: the tiered software framework comprises a first tier, a second tier, and a third tier, the second tier comprises accounts of a first plurality of subscribers, the third tier comprises subaccounts of the accounts, the subaccounts associated with a second plurality of subscribers, and the message template is associated with one of the subaccounts in the third tier; parsing the message template; automatically performing a semantic search for regulated content in the parsed message template by comparing semantics of the text of the parsed message template to semantics of the regulated content using natural language processing to find matches; assigning a score to the message template based on any matches found; and responsive to the score being higher than a predetermined threshold, blocking generating of any message from the message template.

Example 17 provides the non-transitory computer-readable tangible media of example 16, in which the message template is to generate messages to prospects targeted by at least one subaccount of the one of the accounts.

Example 18 provides the non-transitory computer-readable tangible media of any one of examples 16-17, in which: the regulated content is age-specific, and the operations further comprise: responsive to identifying text in the message template that corresponds to age-specific regulated content, adding an age warning to the message template such that each message generated using the message template includes the age warning; and unblocking generating of any messages from the message template.

Example 19 provides the non-transitory computer-readable tangible media of any one of examples 16-18, in which the regulated content comprises: a first set of content regulated by government regulations; and a second set of content regulated by network carrier guidelines.

Example 20 provides the non-transitory computer-readable tangible media of any one of examples 16-19, in which the operations further comprise: reviewing feedback to the messages sent using the message template; and responsive to the feedback, adjusting the predetermined threshold.

Example 21 provides the non-transitory computer-readable tangible media of example 20, in which the feedback is received from at least one of the following: (i) recipients of the messages, (ii) network carrier, and (iii) account to which the one of the subaccounts is a subscriber.

Example 22 provides the non-transitory computer-readable tangible media of any one of examples 16-21, in which the operations further comprise: before performing the semantic search, looking up keywords of the regulated content; comparing a text of the parsed message template with the keywords; and responsive to not finding any matches, automatically performing the semantic search.

Example 23 provides the non-transitory computer-readable tangible media of example 22, in which the operations further comprise: responsive to finding a match, blocking generating of any message from the message template without performing the semantic search.

Example 24 provides the non-transitory computer-readable tangible media of any one of examples 16-23, in which automatically performing the semantic search further comprises: generating a prompt for a natural language processing module, in which the semantics of the text of the parsed message template is compared to the semantics of the regulated content based on the prompt.

Example 25 provides the non-transitory computer-readable tangible media of any one of examples 16-24, in which the operations further comprise: flagging the message template.

Example 26 provides the non-transitory computer-readable tangible media of any one of examples 16-25, in which the operations further comprise: determining that a message associated with the one of the subaccounts is generated without the message template; performing the semantic search on the message generated without the message template; and assigning another score to the message based on any matches returned by the semantic search; and responsive to the another score being higher than the predetermined threshold, blocking sending of the message from the one of the subaccounts.

Example 27 provides the non-transitory computer-readable tangible media of any one of examples 16-26, in which the operations further comprise: generating the predetermined threshold based on feedback received in response to a plurality of messages sent from a plurality of subaccounts.

Example 28 provides the non-transitory computer-readable tangible media of any one of examples 16-27, in which the operations further comprise: responsive to the score being lower than a predetermined threshold, limiting a number of messages generated from the message template to less than another predetermined threshold.

Example 29 provides the non-transitory computer-readable tangible media of example 28, in which: the another predetermined threshold varies according to a number of days that the one of the subaccounts has been subscribed to the tiered software framework, and the another predetermined threshold is higher as the number of days is higher.

Example 30 provides the non-transitory computer-readable tangible media of any one of examples 28-29, in which the another predetermined threshold is a daily limit cap applied on a plurality of subaccounts in the tiered software framework.

Example 31 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: determining that a message template is generated in the tiered software framework, in which: the tiered software framework comprises a first tier, a second tier, and a third tier, the second tier comprises accounts of a first plurality of subscribers, the third tier comprises subaccounts of the accounts, the subaccounts associated with a second plurality of subscribers, and the message template is associated with one of the subaccounts in the third tier; parsing the message template; automatically performing a semantic search for regulated content in the parsed message template by comparing semantics of the text of the parsed message template to semantics of the regulated content using natural language processing to find matches; assigning a score to the message template based on any matches found; and responsive to the score being higher than a predetermined threshold, blocking generating of any message from the message template.

Example 32 provides the apparatus of example 31, in which the message template is to generate messages to prospects targeted by at least one subaccount of the one of the accounts.

Example 33 provides the apparatus of any one of examples 31-32, in which: the regulated content is age-specific, and the apparatus is further configured for: responsive to identifying text in the message template that corresponds to age-specific regulated content, adding an age warning to the message template such that each message generated using the message template includes the age warning; and unblocking generating of any messages from the message template.

Example 34 provides the apparatus of any one of examples 31-33, in which the regulated content comprises: a first set of content regulated by government regulations; and a second set of content regulated by network carrier guidelines.

Example 35 provides the apparatus of any one of examples 31-34, further configured for: reviewing feedback to the messages sent using the message template; and responsive to the feedback, adjusting the predetermined threshold.

Example 36 provides the apparatus of example 35, in which the feedback is received from at least one of the following: (i) recipients of the messages, (ii) network carrier, and (iii) account to which the one of the subaccounts is a subscriber.

Example 37 provides the apparatus of any one of examples 31-36, further configured for: before performing the semantic search, looking up keywords of the regulated content; comparing a text of the parsed message template with the keywords; and responsive to not finding any matches, automatically performing the semantic search.

Example 38 provides the apparatus of example 37, further configured for: responsive to finding a match, blocking generating of any message from the message template without performing the semantic search.

Example 39 provides the apparatus of any one of examples 31-38, in which automatically performing the semantic search further comprises: generating a prompt for a natural language processing module, in which the semantics of the text of the parsed message template is compared to the semantics of the regulated content based on the prompt.

Example 40 provides the apparatus of any one of examples 31-39, further configured for: flagging the message template.

Example 41 provides the apparatus of any one of examples 31-40, further configured for: determining that a message associated with the one of the subaccounts is generated without the message template; performing the semantic search on the message generated without the message template; and assigning another score to the message based on any matches returned by the semantic search; and responsive to the another score being higher than the predetermined threshold, blocking sending of the message from the one of the subaccounts.

Example 42 provides the apparatus of any one of examples 31-41, further configured for: generating the predetermined threshold based on feedback received in response to a plurality of messages sent from a plurality of subaccounts.

Example 43 provides the apparatus of any one of examples 31-42, further configured for: responsive to the score being lower than a predetermined threshold, limiting a number of messages generated from the message template to less than another predetermined threshold.

Example 44 provides the apparatus of example 43, in which: the another predetermined threshold varies according to a number of days that the one of the subaccounts has been subscribed to the tiered software framework, and the another predetermined threshold is higher as the number of days is higher.

Example 45 provides the apparatus of any one of examples 43-44, in which the another predetermined threshold is a daily limit cap applied on a plurality of subaccounts in the tiered software framework.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for automatically facilitating spam blocking in a tiered software framework, the method comprising:
   determining that a message template is generated in the tiered software framework, wherein:
      the tiered software framework comprises a first tier, a second tier, and a third tier,
      the second tier comprises accounts of a first plurality of subscribers,
      the third tier comprises subaccounts of the accounts, the subaccounts associated with a second plurality of subscribers, and
      the message template is associated with one of the subaccounts in the third tier;
   parsing the message template;
   automatically performing a semantic search for regulated content in the parsed message template by comparing semantics of text of the parsed message template to semantics of the regulated content using natural language processing to find matches;
   assigning a score to the message template based on any matches found; and
   responsive to the score being higher than a predetermined threshold, blocking generating of any message from the message template.

2. The method of claim 1, further comprising:
   reviewing feedback to the messages sent using the message template; and
   responsive to the feedback, adjusting the predetermined threshold.

3. The method of claim 1, further comprising:
   before performing the semantic search, looking up keywords of the regulated content;
   comparing a text of the parsed message template with the keywords; and responsive to not finding any matches, automatically performing the semantic search.

4. The method of claim 3, further comprising: responsive to finding a match, blocking generating of any message from the message template without performing the semantic search.

5. The method of claim 1, wherein automatically performing the semantic search further comprises: generating a prompt for a natural language processing module, wherein the semantics of the text of the parsed message template is compared to the semantics of the regulated content based on the prompt.

6. The method of claim 1, further comprising:
determining that a message associated with the one of the subaccounts is generated without the message template;
performing the semantic search on the message generated without the message template; and
assigning another score to the message based on any matches returned by the semantic search; and
responsive to the another score being higher than the predetermined threshold, blocking sending of the message from the one of the subaccounts.

7. The method of claim 1, further comprising: responsive to the score being lower than a predetermined threshold, limiting a number of messages generated from the message template to less than another predetermined threshold.

8. The method of claim 7, wherein:
the another predetermined threshold varies according to a number of days that the one of the subaccounts has been subscribed to the tiered software framework, and
the another predetermined threshold is higher as the number of days is higher.

9. Non-transitory computer-readable tangible media that includes instructions for execution, which when executed by a processor of a computing device, is operable to perform operations comprising:
determining that a message template is generated in a tiered software framework, wherein:
the tiered software framework comprises a first tier, a second tier, and a third tier,
the second tier comprises accounts of a first plurality of subscribers,
the third tier comprises subaccounts of the accounts, the subaccounts associated with a second plurality of subscribers, and
the message template is associated with one of the subaccounts in the third tier;
parsing the message template;
automatically performing a semantic search for regulated content in the parsed message template by comparing semantics of text of the parsed message template to semantics of the regulated content using natural language processing to find matches;
assigning a score to the message template based on any matches found; and
responsive to the score being higher than a predetermined threshold, blocking generating of any message from the message template.

10. The non-transitory computer-readable tangible media of claim 9, wherein the operations further comprise:
reviewing feedback to the messages sent using the message template; and
responsive to the feedback, adjusting the predetermined threshold.

11. The non-transitory computer-readable tangible media of claim 9, wherein the operations further comprise:
before performing the semantic search, looking up keywords of the regulated content;
comparing a text of the parsed message template with the keywords; and
responsive to not finding any matches, automatically performing the semantic search.

12. The non-transitory computer-readable tangible media of claim 11, wherein the operations further comprise: responsive to finding a match, blocking generating of any message from the message template without performing the semantic search.

13. The non-transitory computer-readable tangible media of claim 9, wherein automatically performing the semantic search further comprises: generating a prompt for a natural language processing module, wherein the semantics of the text of the parsed message template is compared to the semantics of the regulated content based on the prompt.

14. The non-transitory computer-readable tangible media of claim 9, wherein the operations further comprise: responsive to the score being lower than a predetermined threshold, limiting a number of messages generated from the message template to less than another predetermined threshold.

15. An apparatus comprising:
a processing circuitry;
a memory storing data; and
a communication circuitry, wherein the processing circuitry executes instructions associated with the data, the processing circuitry is coupled to the communication circuitry and the memory, and the processing circuitry and the memory cooperate, such that the apparatus is configured for:
determining that a message template is generated in a tiered software framework, wherein:
the tiered software framework comprises a first tier, a second tier, and a third tier,
the second tier comprises accounts of a first plurality of subscribers,
the third tier comprises subaccounts of the accounts, the subaccounts associated with a second plurality of subscribers, and
the message template is associated with one of the subaccounts in the third tier;
parsing the message template;
automatically performing a semantic search for regulated content in the parsed message template by comparing semantics of text of the parsed message template to semantics of the regulated content using natural language processing to find matches;
assigning a score to the message template based on any matches found; and
responsive to the score being higher than a predetermined threshold, blocking generating of any message from the message template.

16. The apparatus of claim 15, further configured for:
reviewing feedback to the messages sent using the message template; and
responsive to the feedback, adjusting the predetermined threshold.

17. The apparatus of claim 16, wherein the feedback is received from at least one of the following: (i) recipients of the messages, (ii) network carrier, and (iii) account to which the one of the subaccounts is a subscriber.

18. The apparatus of claim 15, further configured for:
before performing the semantic search, looking up keywords of the regulated content;
comparing a text of the parsed message template with the keywords; and responsive to not finding any matches, automatically performing the semantic search.

19. The apparatus of claim 18, further configured for: responsive to finding a match, blocking generating of any message from the message template without performing the semantic search.

20. The apparatus of claim 15, further configured for: responsive to the score being lower than a predetermined threshold, limiting a number of messages generated from the message template to less than another predetermined threshold.

\* \* \* \* \*